United States Patent Office 3,652,765
Patented Mar. 28, 1972

3,652,765
PHARMACEUTICAL COMPOSITIONS AND METHODS FOR THE TREATMENT OF ALLERGIC ASTHMA
Gwynn Pennant Ellis, Heath, Cardiff, Wales, and Arthur Hedley Wragg, Middlewich, England, assignors to Fisons Pharmaceuticals Limited, Loughborough, Leicestershire, England
No Drawing. Continuation-in-part of application Ser. No. 643,352, June 5, 1967, which is a continuation-in-part of application Ser. No. 300,901, Aug. 8, 1963. This application Oct. 9, 1969, Ser. No. 865,160
Claims priority, application Great Britain, Aug. 18, 1962, 31,797/62
Int. Cl. A61k 27/00
U.S. Cl. 424—282
14 Claims

ABSTRACT OF THE DISCLOSURE

Pharmaceutical compositions which are useful in the treatment of asthma and the like contain, as active ingredient, a chromone derivative of the formula:

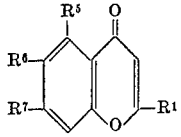

or a salt, ester or amide thereof, wherein the variables are defined in the following specification, for example:

6-propoxychromone-2-carboxylic acid;
6,7-methylenedioxychromone-2-carboxylic acid;
cyclopento[g]chromone-2-carboxylic acid; and
5,6-benzochromone-2-carboxylic acid.

---

The present application is a continuation-in-part of application Ser. No. 643,352, filed June 5, 1967 which in turn is a continuation-in-part of application Ser. No. 300,901, filed Aug. 8, 1963, both prior applications being now abandoned.

The present invention relates to pharmaceutical compositions containing chromone derivatives.

It has now been found that certain chromone derivatives as hereinafter defined, possess activity as inhibitors of the effects of certain antigen-antibody reactions, notably in the treatment of allergic asthma.

Accordingly, the present invention is for a pharmaceutical composition comprising a pharmaceutical carrier or diluent in admixture with an anti-allergic asthma effective amount of a chromone derivative selected from the group consisting of chromone derivatives of the formula:

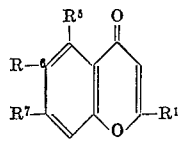

and pharmaceutically acceptable salts thereof, in which $R^1$ is selected from the group consisting of carboxy, carboxy alkyl esters in which the alkyl groups contain from 1 to 4 carbon atoms, carboxy amide and β-diethylaminoethyl carbamide; $R^5$ is selected from the group consisting of hydrogen and, together with $R^6$ and the 5- and 6-positioned carbon atoms, benzo; $R^6$ is selected from the group consisting of hydrogen, alkoxy containing from 2 to 5 carbon atoms, di(lower)alkylamino(lower)alkoxy said group having a total of from 3 to 8 carbon atoms and, together with $R^7$ methylenedioxy, and together with $R^7$ and the 6- and 7-positioned carbon atoms, cyclopentano; and $R^7$ is selected from the group consisting of hydrogen, alkoxy containing from 2 to 5 carbon atoms and di(lower)alkylamino(lower)alkoxy, said group containing a total of from 3 to 8 carbon atoms; at least one of $R^5$, $R^6$ and $R^7$ being other than hydrogen.

Salts of the chromone derivatives which may be mentioned are salts with physiologically acceptable cations, for example ammonium salts, metal salts such as alkalimetal salts (e.g. sodium, potassium or lithium salts) and alkaline-earth metal salts (e.g. magnesium and calcium salts) and salts with organic bases (e.g. amine salts such as piperidine and triethanolamine salts).

Esters which may be mentioned are simple lower alkyl esters in which the alkyl group contains from 1 to 4 carbon atoms (e.g. methyl, ethyl, propyl, isopropyl, butyl, isobutyl and tert. butyl esters). Amides which may be mentioned are amides with ammonia and with lower alkylamines such as methylamine, ethylamine, propylamine, isopropylamine, butylamine etc.

The chromone derivatives employed in the compositions according to the invention have been found to inhibit the release and/or action of toxic products which arise from the combination of certain types of antibody and specific antigen, e.g. the combination of reaginic antibody with specific antigen. In man, it has been found that both subjective and objective changes which result from the inhalation of specific antigen by sensitised subjects are inhibited by prior administration of the chromone derivatives. Thus, the compositions are of value in the prophylactic treatment of asthma.

The nature of the composition and the pharmaceutical carrier or diluent will, of course, depend upon the desired route of administration, i.e. orally, parenterally or by inhalation.

In general, for the prophylactic treatment of asthma, the composition will be in a form suitable for administration by inhalation. Thus, the composition may comprise a suspension or solution of the active ingredient in water for administration by means of a conventional nebulizer. Alternatively the compositions may comprise a suspension or solution of the active ingredient in a conventional liquefied propellant, such as dichlorodifluoromethane or chlorotrifluoroethane, to form a so-called "aerosol" composition to be administered from a pressurised container. The compositions may also comprise the solid active ingredient diluted with a solid diluent, e.g. lactose, for administration from a powder inhalation device.

The pharmaceutical compositions of the invention generally comprise a minor proportion of active chromone ingredient and a major proportion of carrier or diluent. Thus, for example, the solutions for administration by a conventional nebulizer will comprise a dilute solution e.g. containing up to about 10% of the active ingredient in sterile water, and compositions comprising suspensions or solutions in pressurised propellants will contain, for example, about 2–5% of the active ingredient. However, where the composition comprises the solid active ingredient diluted with a solid diluent, the diluent may be present in less, equal or greater amount than the solid active ingredient, for example the diluent may be present in an amount of from 50 to 150% by weight of the solid active ingredient.

The invention also includes within its scope a method of inhibiting the effects of the antigen-antibody reaction which comprises the prior application to the area of the antigen-antibody mechanism a therapeutically effective amount of a chromone derivative as defined above, preferably in the form of a salt.

According to a particular embodiment, the invention is for a method of relieving or preventing allergic airway obstruction which comprises administering to the patient a therapeutically effective amount (e.g. 1–100 mg.) at suitable intervals, of a chromone derivative as defined above, particularly in the form of a salt.

The chromone derivatives in which $R^1$ is a carboxy group may be prepared by the condensation of an acetophenone of the formula:

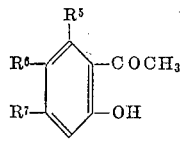

with a dialkyl oxalate, such as diethyl oxalate, in the presence of a suitable condensation catalyst such as an alkali metal alkoxide, metallic sodium or sodium hydride in the presence of a solvent such as ethanol or dioxan. The condensation product is then cyclised by heating in the presence of a cyclisation agent such as glacial acetic acid containing a small amount of hydrochloric or hydrobromic acid, concentrated sulphuric acid or ethanol containing hydrogen chloride.

Compounds in which $R^1$ is a $\beta$ - diethylaminoethylcarbamide group may be prepared by reaction of the corresponding compound in which $R^1$ is a carboxy group, or a reactive derivative thereof, with $\beta$-diethylaminoethylamine.

The following examples are given to illustrate the present invention, the parts and percentages being by weight.

EXAMPLE 1

25 parts of acetyl chloride were added to a solution of 40.5 parts of 4-isopropylphenol in 60 parts of glacial acetic acid. The solution was left at room temperature for 15 minutes and was then heated at 80° C. for 30 minutes. After cooling the solution was diluted with 300 parts of water and the product was extracted three times with 80 part portions of chloroform. The combined extracts were washed with water and an excess of dilute sodium bicarbonate solution, dried over sodium sulphate and evaporated, leaving 53 parts of 4-isopropylphenyl acetate as a pale yellow oil. The 53 parts of 4-isopropylphenyl acetate were mixed with 600 parts of dry carbon disulphide and 50 parts of powdered aluminium chloride and the mixture was refluxed for 2½ hours. The solvent was distilled off, finally under vacuum, and the residue heated at 140° C. for 30 minutes. After cooling, ice and water were added to decompose the complex and the product was extracted twice with 100 part portions of ether. The ether solution was washed with water, dried over sodium sulphate and evaporated. The remaining oil was distilled and gave 41 parts (77% yield) of 2-hydroxy-5-isopropylacetophenone, boiling point 86–90° C. at 0.9 mm. mercury pressure.

Analysis.—Found (percent): C, 73.8; H, 7.86. $C_{11}H_{14}O_2$ requires (percent): C, 74.1; H, 7.92.

A solution of 35.4 parts of 2-hydroxy-5-isopropylacetophenone in 200 parts of dry dioxan and 117 parts of diethyl oxalate was stirred and cooled to 0° C., and 14.4 parts of sodium hydride were added slowly during three hours. When approximately two parts of the sodium hydride had been added the mixture was warmed to 60° C. to ensure that the reaction was proceeding. The mixture was then cooled and more hydride was added. This procedure was necessitated by the excessive foaming which occurred during the reaction. Finally the mixture was heated at 80–90° C. for 30 minutes and was then cooled and diluted with 1,000 parts of water. 60 parts of glacial acetic acid were added and the reaction product was extracted with three 100 part portions of chloroform. The combined chloroform extracts were washed with water and with an excess of dilute sodium bicarbonate solution and were dried over sodium sulphate. The chloroform solution was evaporated and the excess of diethyl oxalate was removed by vacuum distillation leaving a pale orange oil. This oil was dissolved in 48 parts of glacial acetic acid and 3 parts of concentrated hydrochloric acid and the solution was heated under reflux for 30 minutes. To the mixture was then added 35 parts of 4 N sulphuric acid and the solution was heated under reflux for six hours. After standing at room temperature for two days the grey solid was filtered off, washed with 50:50 acetic acid and water mixture and dried at 100° C., giving 19 parts of 6-isopropylchromone-2-carboxylic acid (melting point 209–213° C., yield 41%).

The crude acid was dissolved in dilute sodium carbonate solution. The solution was charcoaled, filtered and acidified yielding 17.5 parts of the acid as a white powder, melting point 212–215° C. After recrystallisation from dioxan, it melted at 216–218° C.

Analysis.—Found: C, 66.7%; H, 5.29%; equivalent weight 232. $C_{12}H_{12}O_4$ requires: C, 67.2%; H, 5.21%; equivalent weight 232.

EXAMPLE 2

A solution of 3.52 parts of 5-acetyl-6-hydroxyindane (prepared by the method of Baker, J.C.S. 1937, 476) in 20 parts of dry dioxan and 11.7 parts of diethyl oxalate was stirred at 0° C. To the solution 1.45 parts of sodium hydride was added in three portions during 15 minutes and the mixture was stirred at 0° C. for 90 minutes. The mixture was then heated at 60° C. for 50 minutes during which time the mixture became orange-yellow and partially solidified. After a further 45 minutes heating at 65° C. the mixture was cooled and diluted with 200 parts of water and 10 parts of glacial acetic acid were added. The reaction product was extracted with four 60-part portions of chloroform and the combined extracts were washed with water and an excess of dilute sodium bicarbonate solution. The chloroform solution was dried over sodium sulphate and evaporated leaving 5.71 parts of a pale yellow solid. This was converted to the required product by dissolving it in 25 parts of glacial acetic acid and 5 parts of concentrated hydrochloric acid and heating the mixture under reflux for four hours. After cooling the white product was filtered off, washed with cold glacial acetic acid, ethanol and light petroleum (boiling point 40–60° C.) and dried at 100° C. The product was a white crystalline acid, in amount 4.18 parts (91% yield; melting point 266–269° C.) which was purified by dissolving it in a slight excess of 0.1 N sodium hydroxide. The solution was charcoaled, filtered and acidified with stirring with dilute hydrochloric acid. The precipitated acid was filtered off, washed with water and dried at 100° C., giving 4.07 parts of cyclopentano[g]-chromone-2-carboxylic acid (yield 89%), melting point 269–271° C.

Analysis.—Found (percent): C, 68.2; H, 4.54. $C_{13}H_{10}O_4$ requires (percent): C, 67.8; H, 4.38.

EXAMPLE 3

To 30.4 parts of quinoacetophenone in 300 parts of dry acetone were added 49.8 parts of potassium iodide and 27.6 parts of potassium carbonate. 36.9 parts of n-propyl bromide were then added and the mixture was heated to boiling point and stirred at this temperature for 48 hours. 100 parts of water were added to the cooled mixture which was then acidified with 2 N sulphuric acid. After extracting the solution with ether, drying the extracts, and distilling off the ether, a low melting solid was obtained. Purification by vacuum distillation gave 17 parts of 5-propoxy-2-hydroxyacetophenone (boiling point 140° C. at 7 mm. mercury pressure) as a yellow oil which solidified on cooling to a solid, melting point 44–46° C.

Analysis.—Found (percent): C, 68.0, H, 7.2. $C_{11}H_{14}O_3$ requires (percent): C, 68.0; H, 7.3.

35 parts of diethyl oxalate and 48 parts of dry dioxan were added to 11.6 parts of 5-propoxy-2-hydroxyacetophenone and the mixture was stirred and cooled with an ice-salt bath. 2.1 parts of sodium hydride were added and the yellow mixture was warmed up slowly to about 90° C. The mixture became red in colour and after cooling it a little, a further 2.2 parts of sodium hydride were added. The mixture was heated at 100° C. for 30 minutes and left to stand overnight. Then 100 parts of water were added with stirring and after 30 parts of acetic acid had been added a solid which precipitated re-dissolved. Extraction with chloroform, washing the extracts with water and drying them with sodium sulphate and removing the solvent gave 20.7 parts of an oil which was hydrolysed and cyclised by heating with 18 parts of acetic acid and 1.5 parts of concentrated hydrochloric acid for 30 minutes. Then 20 parts of 4 N sulphuric acid were added and the solution was heated under reflux for five hours. On cooling, a solid separated out and was filtered, washed and dried. The crude solid (12.9 parts, melting point 186–190° C.) was recrystallised from dioxan and gave 9.9 parts of 6-propoxychromone-2-carboxylic acid (melting point 199–201° C.)

*Analysis.*—Found (percent): C, 62.7; H, 4.9. $C_{13}H_{12}O_5$ requires (percent): C, 62.9; H, 4.9.

EXAMPLE 4

A solution of 4.66 parts of 1-acetyl-2-hydroxynaphthalene in 25.6 parts of diethyl oxalate was added to a warm solution of sodium ethoxide prepared from 2.7 parts of sodium and 50 parts of absolute ethanol. The mixture was heated and stirred on a steam bath for 30 minutes and became viscous and orange red in colour. After cooling, 250 parts of water were added and the solution was acidified with an excess of acetic acid. The product was extracted with three 80-part portions of chloroform and the combined extracts were washed with water and an excess of dilute sodium bicarbonate solution and dried over sodium sulphate. The chloroform and excess diethyl oxalate were distilled off in vacuo and the product was cyclised and hydrolysed by heating under reflux with 40 parts of glacial acetic acid and 8 parts of concentrated hydrochloric acid. After cooling, the white acid product was filtered off, washed with a little glacial acetic acid and water and dried at 100° C. The crude product (4.6 parts) melted at 292–293° C. This was purified by dissolving it in a slight excess of 0.2 N sodium hydroxide solution, charcoaling and filtering the solution and acidifying it with excess hydrochloric acid. The precipitated 5,6-benzochromone-2-carboxylic acid was separated by centrifuging and was washed with water, methanol and ether in amount 4.5 parts (yield 75%, melting point 304–305° C.).

*Analysis.*—Found (percent): C, 69.8; H, 3.54. $C_{14}H_8O_4$ requires (percent): C, 70.0; H, 3.36.

EXAMPLE 5

The antianaphylactic activity of the compounds may be demonstrated in human volunteers who suffer from specific allergic asthma by administering the compound as an aerosol one hour before the antigen to which the subjects are sensitive. By measuring the reduction of air-way resistance in control experiments and after the administration of the compounds, it is possible to estimate the degree of protection afforded. A suitably designed spirometer is used to measure the forced expiratory volume at one second ($F.E.V._{-1.0}$). Then, the activity of the compound is expressed as follows:

Percent protection=100×

$$\left[ \frac{Av.\ max.\ percent\ F.E.V._{-1.0}}{Av.\ max.\ percent\ F.E.V._{-1.0}\ fall\ control\ shock} - \frac{Max.\ percent\ of\ F.E.V._{-1.0}\ fall\ test\ shock}{fall\ control\ shock} \right]$$

Using this method, the following percentage protection was shown by administering a 5% aerosol (estimated dose inhaled 1 mg.) of the compound named:

| | Percent |
|---|---|
| 6-propoxychromone-2-carboxylic acid, sodium salt | 47 |
| 6,7-methylenedioxychromone-2-carboxylic acid, sodium salt | 40 |
| Cyclopentano[g]chromone-2-carboxylic acid, sodium salt | 42 |
| 5,6-benzochromone-2-carboxylic acid, sodium salt | 38 |

Antihistamines, such as for example mepyramine, afforded less than 10% protection under similar conditions or following maximal clinical dosage by oral or intramuscular routes.

The following Table I gives the melting points and analytical date of further compounds according to the invention which were prepared.

TABLE I

| Ex. No. | Name | Melting point, degree | Formula | Found C | H | N | Cl | E. wt. | Required C | H | N | Cl | E. wt. |
|---|---|---|---|---|---|---|---|---|---|---|---|---|---|
| 6 | 7-propoxychromone-2-carboxylic acid | ¹214–6 | $C_{13}H_{12}O_5$ | 63.2 | 5.09 | | | | 62.9 | 4.87 | | | |
| 7 | 7-isopropoxychromone-2-carboxylic acid | ¹235 | $C_{13}H_{12}O_5$ | 62.4 | 4.73 | | | | 62.9 | 4.87 | | | |
| 8 | 7-butoxychromone-2-carboxylic acid | ¹210 | $C_{14}H_{14}O_5$ | 64.1 | 5.64 | | | | 64.1 | 5.38 | | | |
| 9 | 7-pentoxychromone-2-carboxylic acid | ¹177–8 | $C_{15}H_{16}O_5$ | 65.1 | 5.76 | | | | 65.2 | 5.84 | | | |
| 10 | 6-butoxychromone-2-carboxylic acid | 189–92 | $C_{14}H_{14}O_5$ | 63.8 | 5.50 | | | | 64.1 | 5.38 | | | |
| 11 | Ethyl-7-(beta-diethylaminoethoxy)-chromone-2-carboxylate, hydrochloride | 177–8 | $C_{18}H_{23}NO_5 \cdot HCl$ | | | 9.67 | | | | | 9.61 | | |
| 12 | Ethyl-6-(beta-diethylaminoethoxy)-chromone-2-carboxylate, hydrochloride | 182–4 | $C_{18}H_{23}NO_5 \cdot HCl$ | | | 9.44 | | | | | 9.60 | | |
| 13 | 7-(beta-diethylaminoethoxy)chromone-2-carboxylic acid | ¹233–5 | $C_{16}H_{19}NO_5$ | | | ²4.16 | | | | | 4.59 | | |
| 14 | 6,7-methylenedioxychromone-2-carboxylic acid. | ¹302–3 | $C_{11}H_6O_6$ | 56.5 | 2.68 | | | 236 | 56.4 | 2.58 | | | 234 |
| 15 | 7-propoxychromone-2-(beta-diethylaminoethyl)-carboxamide, hydrogen oxalate. | 187–8 | $C_{19}H_{26}H_2O_4(COOH)_2$ | | | 6.42 | | | | | 6.43 | | |
| 16 | 7-propoxychromone-2-(beta-diethylaminoethyl)-carboxamide, methobromide. | 219–20 | $C_{20}H_{29}BrN_2O_4$ | | | 6.31 | | | | | 6.35 | | |

¹ Decomposition.  ² Known to contain 4.7% NaCl.

We claim:

1. A pharmaceutical composition comprising a pharmaceutical carrier in admixture with an anti-allergic asthma effective amount of a member selected from the group consisting of a chromone derivative of the formula:

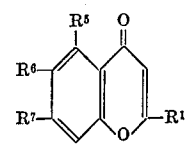

and a pharmaceutically acceptable salt, thereof in which $R^1$ is selected from the group consisting of carboxy, carboxy alkyl ester in which the alkyl groups contain from 1 to 4 carbon atoms, carbamide and β-diethylaminoethylcarbamide; $R^5$ is selected from the group consisting of hydrogen, and together with $R^6$ and the 5- and 6-positioned carbon atoms, benzo; $R^6$ is selected from the group consisting of hydrogen, alkoxy containing from 2 to 5 carbon atoms, di(lower)alkylamino(lower)alkoxy said group having a total of from 3 to 8 carbon atoms and, together with $R^7$, methylenedioxy and, together with $R^7$ and the 6- and 7- positioned carbon atoms, cyclopentano; and $R^7$ is selected from the group consisting of hydrogen, alkoxy containing from 2 to 5 carbon atoms and di(lower) alkylamino(lower)alkoxy said group having a total of from 3 to 8 carbon atoms; at least one of $R^5$, $R^6$ and $R^7$ being other than hydrogen.

2. A pharmaceutical composition according to claim 1 wherein said chromone derivative is 6-propoxy-chromone-2-carboxylic acid.

3. A pharmaceutical composition according to claim 1 wherein said chromone derivative is 6,7-methylenedioxy-chromone-2-carboxylic acid.

4. A pharmaceutical composition according to claim 1 wherein said chromone derivative is cyclopentano[g]chromone-2-carboxylic acid.

5. A pharmaceutical composition according to claim 1 wherein said chromone derivative is 5,6-benzochromone-2-carboxylic acid.

6. A composition according to claim 1 wherein the chromone derivative is in the form of a physiologically acceptable salt.

7. A composition according to claim 6 wherein the chromone derivative is in the form of an ammonium salt.

8. A composition according to claim 6 wherein the chromone derivative is in the form of an alkaline-earth metal salt.

9. A composition according to claim 6 wherein the chromone derivative is in the form of an alkali-metal salt.

10. A composition according to claim 1 comprising a solution or suspension of the chromone derivative in water.

11. A composition according to claim 1 comprising a solution or suspension of the chromone derivative in a liquified aerosol propellant.

12. A composition according to claim 1 comprising the solid chromone derivative diluted with a solid pharmaceutical diluent.

13. A method for the prophylactic treatment of allergic asthma by the oral administration to a patient subject to such ashma of an anti-allergic asthma effective amount of a chromone derivative selected from the group consisting of a compound of the formula:

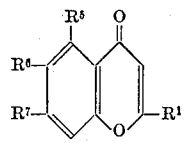

and a physiologically acceptable salt thereof in which $R^1$ is selected from the group consisting of carboxy, carboxy alkyl ester in which the alkyl groups contain from 1 to 4 carbon atoms, carboxyamide and β-diethylaminoethylcarbamide; $R^5$ is selected from the group consisting of hydrogen, and, together with $R^6$ and the 5- and 6-positioned carbon atoms, benzo; $R^6$ is selected from the group consisting of hydrogen, alkoxy containing from 2 to 5 carbon atoms, di(lower)alkylamino(lower)alkoxy said group containing a total of from 3 to 6 carbon atoms and, together with $R^7$, methylenedioxy and, together with $R^7$ and the 6- and 7-positioned carbon atoms, cyclopentano; and $R^7$ is selected from the group consisting of hydrogen, alkoxy containing from 2 to 5 carbon atoms and di(lower) alkylamino(lower)alkoxy said group containing a total of from 3 to 8 carbon atoms; at least one of $R^5$, $R^6$ and $R^7$ being other than hydrogen.

14. A method according to claim 13 wherein from 1 to 100 mg. of chromone derivative is employed.

References Cited
UNITED STATES PATENTS 3,322,795   5/1967   Ellis et al. _____ 260—345.2

STANLEY J. FRIEDMAN, Primary Examiner

U.S. Cl. X.R.

424—283; 260—345.2